(12) United States Patent
Ahnert (10) Patent No.: US 7,325,291 B2
(45) Date of Patent: Feb. 5, 2008

(54) METHOD FOR ASSEMBLING A CLUTCH SYSTEM

(75) Inventor: Gerd Ahnert, Sasbach (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 557 days.

(21) Appl. No.: 10/773,027

(22) Filed: Feb. 5, 2004

(65) Prior Publication Data

US 2004/0216296 A1    Nov. 4, 2004

Related U.S. Application Data (63) Continuation of application No. PCT/DE02/02830, filed on Aug. 1, 2002.

(30) Foreign Application Priority Data

Aug. 6, 2001    (DE) ................. 101 38 570

(51) Int. Cl.
*B23P 21/00*    (2006.01)
*F16D 21/02*    (2006.01)

(52) U.S. Cl. .............. 29/469; 29/434; 29/426.1; 29/426.5; 192/48.91; 192/70.17

(58) Field of Classification Search ............ 29/434, 29/469, 893.1, 426.1, 426.5; 192/48.8, 48.9, 192/48.91, 212, 70.17
See application file for complete search history.

(56) References Cited

U.S. PATENT DOCUMENTS

| | | | |
|---|---|---|---|
| 3,207,142 A | 9/1965 | Gorissen | 123/195 |
| 4,440,281 A * | 4/1984 | Hauguth | 192/48.8 |
| 4,655,335 A | 4/1987 | Maruyamano | 192/99 |
| 5,042,135 A * | 8/1991 | Kroninger et al. | 29/467 |
| 5,407,047 A | 4/1995 | Weidinger | 192/70.13 |
| 5,459,916 A * | 10/1995 | Jackel et al. | 29/407.08 |
| 5,459,918 A * | 10/1995 | Uchida et al. | 29/434 |
| 5,649,348 A * | 7/1997 | Jackel et al. | 29/407.08 |
| 5,713,119 A | 2/1998 | Lagatta | |
| 5,788,037 A * | 8/1998 | Forsyth et al. | 192/70.12 |
| 5,799,766 A * | 9/1998 | Link et al. | 192/70.16 |
| 6,550,599 B2 * | 4/2003 | Kudou et al. | 192/223.2 |
| 6,609,602 B2 * | 8/2003 | Gochenour et al. | 192/105 C |
| 6,666,313 B2 * | 12/2003 | Gochenour et al. | 192/55.61 |
| 6,808,055 B1 * | 10/2004 | Kummer et al. | 192/105 C |
| 6,830,140 B2 * | 12/2004 | Zink et al. | 192/48.9 |
| 2002/0060118 A1 * | 5/2002 | Beneton et al. | 192/48.8 |
| 2004/0216978 A1 * | 11/2004 | Kummer et al. | 192/105 C |
| 2006/0016661 A1 * | 1/2006 | George et al. | 192/85 AA |

FOREIGN PATENT DOCUMENTS

| | | |
|---|---|---|
| DE | 25 52 851 | 5/1977 |
| DE | 31 23 151 | 12/1982 |
| DE | 82 21 673 | 8/1986 |
| DE | 43 17 332 | 12/1993 |
| GB | 2352214 | 1/2001 |

* cited by examiner

*Primary Examiner*—Essama Omgba
(74) *Attorney, Agent, or Firm*—Simpson & Simpson, PLLC (57) ABSTRACT

A method for assembling a clutch system on a drivetrain is proposed in which the clutch system is mounted on the transmission and in which the transmission is then connected to the engine block.

16 Claims, 6 Drawing Sheets

METHOD FOR ASSEMBLING A CLUTCH SYSTEM

CROSS-REFERENCE TO RELATED APPLICATIONS

This application is filed under 35 U.S.C. §120 and §365(c) as a continuation of International Patent Application PCT/DE02/02830, filed Aug. 1, 2002 and published Feb. 27, 2003, which application is incorporated by reference herein. This application also claims priority of German Patent Application No. 101 38 570.6, filed Aug. 6, 2001, which application is incorporated herein by reference.

BACKGROUND OF THE INVENTION

The invention relates to a method for assembling a clutch system on a drivetrain.

Combination clutches of seamless transmissions and dual clutches of dual-clutch transmissions are sufficiently known from vehicle technology. The aforementioned clutch systems each include two clutches. In a known method for assembling and/or dismantling the aforementioned clutch systems, the procedure is as follows: the dual mass flywheel is bolted to the engine shaft on the engine block. Then the clutch plate of the first clutch is installed. The remaining clutch parts are bolted onto the secondary mass part of the dual-mass flywheel in a block (including the second clutch plate). Next, the transmission is put on the engine block.

In the known method, the placement of the transmission on the engine block is especially problematic. In this process, two keyed transmission input shafts must be slipped into the hubs of each clutch plate and the pilot bearing must be pushed in.

The combination clutch of the seamless transmission has one clutch and the dual clutch of the dual clutch transmission has two clutches that are engaged by pressure. Because the clutch plates of clutches that are engaged by pressure are not clamped by the pressure plate during assembly, the insertion of the transmission shafts in the clutch hub is only possible using additional assembly aids.

Another disadvantage is that in the assembly of the transmission on the engine block a relatively large mass must be handled by hand. In this context the transmission input shaft and the clutch parts can bump against each other. Thus, damage can occur that is not detected immediately.

OBJECTS OF THE INVENTION

The object of the present invention is to propose a method for the assembly of a clutch system on a drivetrain in which the assembly of the clutch system on an engine block and the transmission is improved and the known disadvantages from the prior art are prevented.

SUMMARY OF THE INVENTION

The objective is achieved in accordance with the present invention by proposing a method for the assembly of a clutch system on a drivetrain in which the clutch system is mounted on the transmission and in which the transmission is then joined to the engine block.

According to the invention, the clutch system is mounted not directly on the engine shaft, but on the transmission. Because the clutch system (approximately 20 kg) has a lower weight than the transmission (40 kg), this method is advantageous because it enables an easier assembly. Accordingly, in the method of the invention, the two clutch plates of the clutch system and the secondary mass of the dual mass flywheel are first set on the transmission. In order to hold the clutch on the transmission radially during the assembly, an existing pilot bearing may be integrated in the clutch parts.

A possible variant of the invention can be provided by virtue of the secondary mass part of the dual-mass flywheel, the clutch plates and a release system for the system being mounted as a unit in a clutch bell housing of the transmission. Accordingly, a unit comprising the secondary mass part of the dual-mass flywheel, the clutch system and the release system is introduced into the clutch bell housing. According to a further development of the invention, this entire unit can be axially set within the clutch bell housing. A lock to be provided for this purpose can also be provided to secure the release system torsionally. For example, an electrical connection of an electrical central [or concentric] release actuator of the release system can also be integrated as a plug connector.

In the described variants, at least one part of the dual-mass flywheel can be integrated on the engine side. For this purpose, a further development of the present invention can provide that the primary mass is fastened to a sealed-off area of the dual-mass flywheel on the engine shaft.

In the assembly of engine block and transmission, the individual parts of the dual-mass flywheel, for example, can be joined to each other. In this context it is possible to enable a centering and a torque transmission.

The axial reaction force for the disengaging force of the clutch system can preferably be supported via a clutch cover. Preferably, a slide bearing or similar item can therefore be provided between the parts of the dual-mass flywheel, preferably without axial fixation.

In dismantling according to the invention, the transmission can be separated from the engine block. In an advantageous manner, only a relatively small axial travel is to be covered in the process. This is especially advantageous in vehicles with front-transverse installations. Damage to the individual parts is thus prevented in the method of the present invention.

Then a lock between the release system and the clutch bell housing can preferably be released. A switching of individual clutch plates is then possible in an advantageous way by further dismantling of the clutch system.

In the aforementioned variant, it is conceivable that the dual-mass flywheel is preferably also divided in a different way in the assembly according to the invention.

It is also possible for all parts of the dual-mass flywheel to be integrated in the clutch block.

Furthermore, it is conceivable that an axial fixing of the cover in the clutch bell housing is also used for dual clutches or other engagement systems. For example, openings or similar arrangements for an axial airflow may be provided by movement of the axially supportive roller bearing in the clutch cover, preferably in the inner area of the dual-mass flywheel.

In the proposed variants, at least the advantages of an easier assembly of the clutch system within the clutch bell housing are provided. Furthermore, the clutch can preferably be supported during assembly via two bearings in the clutch bell housing. Moreover, during the assembly an axial fixing of the clutch in the clutch bell housing can be produced. During the dismantling, only a small axial travel is to be covered and the dismantling can be carried out at any desired state of the release system. Furthermore, no manual unlocking is required before the dismantling, so that possible mistakes are thereby avoided. In the method of the invention, because of the axial cover force support, the disengaging forces do not put pressure on the engine shaft bearings. This is also true for clutches that are engaged by pressure. Moreover, the release system can operate with a small movement range, because multiple installation tolerances no longer need to be observed.

In another variant of the method of the invention, it may be provided that the clutch system is axially fixed on the engine shaft. Accordingly, the release system for the clutch system, the clutch plates of the clutch system and at least one part of the dual-mass flywheel can be integrated in the transmission. Preferably, the release system can be placed in the clutch bell housing. A unit comprising the secondary mass part of the dual-mass flywheel and the clutch plates preferably in this context can be placed in the clutch bell housing.

On the engine side, at least one part of the dual-mass flywheel can be integrated in the engine. For example, the primary mass part of the dual-mass flywheel can preferably be bolted together with the engine shaft as a single part. If the transmission along with the clutch system is then fit onto the engine block, the connection can be produced between the primary mass part of the dual-mass flywheel and the clutch system. For this purpose, a centering, a torsional slaving and an axial fixation can be provided via a lock, especially in the case of tractive operation.

For dismantling, the transmission can, in the previously described versions of the transmission, be separated from the engine block. However, in this context, the transmission input shafts are completely extracted from the clutch. Then, the lock between the primary mass part and the clutch system can be released. Individual clutch plates can be replaced in an advantageous manner by further dismantling of the clutch system.

Also for this variant, the dual-mass flywheel can be separated in a different manner. It is possible that all parts of the dual-mass flywheel are integrated in the clutch block. Furthermore, it is conceivable that the torsional slaving can occur on a larger diameter. The axial fixing to the engine shaft can be designed according to the force direction of the clutch actuation movements. If, for example, only compressive forces occur, two-sided force support may be omitted. However, in this context the axial fluctuations of the engine shaft are to be taken into consideration.

For the axial fixing in the outer area of the clutch, a bolt connection may preferably be provided. The bolts may be installed in an advantageous way on the engine side. Before dismantling the transmission, these bolts can be unscrewed. The clutch parts can remain in the clutch bell housing during this process. The required travel for removing the transmission from the engine block is thereby substantially reduced.

It is possible for a fixed-covered disengagement system to be used.

This arrangement is preferably possible for a combination clutch system having compressive and tractive operation. However, before dismantling the transmission, a junction point should then be separated. This can be, for example, the connection of the release system or the locking of the clutch system.

The method of the invention may preferably be used for seamless combination clutches or double clutches as well as all other clutch systems, especially with a pilot bearing.

The patent claims submitted along with the application are formulation proposals without prejudice for the attainment of more extensive patent protection. The applicant reserves the right to claim still other feature combinations previously only disclosed in the description and/or drawings.

References used in the dependent claims refer to the further configuration of the subject matter of the main claim by the features of each dependent claim; they are not to be understood as renunciation of the attainment of separate, concrete protection for the feature combinations of the referred dependent claims.

Because the subject matter of the dependent claims may constitute separate and independent inventions with respect to the state of the art on the priority date, the applicant reserves the right to make them the subject matter of independent claims or partial declarations. Furthermore, they may also include independent inventions that have a configuration independent of the subject matter of the preceding dependent claims.

The exemplary embodiments are not to be understood as a limitation of the invention. Rather, numerous alterations and modifications are possible within the context of the present publication, especially such variants, elements and combinations and/or materials that may be inferred by one skilled in the art with regard to the resolution of the problem using, for example, a combination or adaptation of individual features, elements or methodological steps that are described in the general description and embodiments as well as the claims and are contained in the drawings and, using combinable features, lead to a new subject matter or to new methodological steps or methodological sequences, even if they pertain to manufacturing, testing and operating method.

Additional advantages and embodiments arise from the dependent claims and from the drawings described below.

DETAILED DESCRIPTION OF THE PREFERRED EMBODIMENT

In FIGS. 1 to 4, a possible variant of the method according to the invention is indicated, an additional variant of the method being depicted in FIGS. 5 to 9. In all of these, the equivalent components are designated by the same reference characters.

In FIGS. 1 to 5, each shows three illustrations that depict in its essentials the assembling and dismantling of clutch system 106 on a drivetrain, each according to the two variants.

Figure 1:
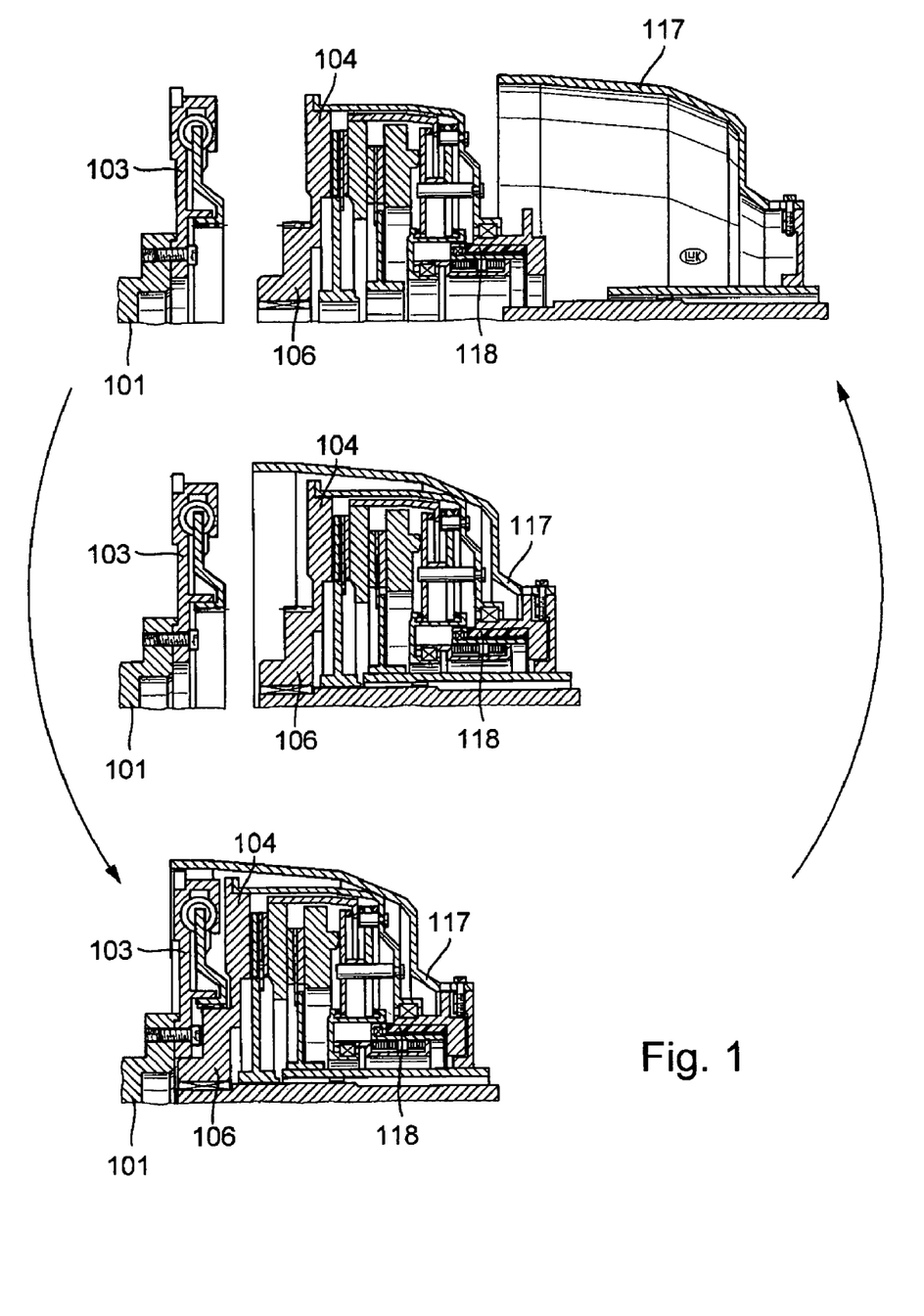
FIG. 1 illustrates a possible variant of a method according to the invention for assembling and dismantling a clutch system.

In FIG. 1 a unit comprising a secondary mass part 104 of the second flywheel, a clutch system 106 and the release system 118 is represented in a first assembly step (top illustration). The represented unit is then installed in clutch bell housing 117, as indicated by the center illustration in FIG. 1. This entire unit is attached in clutch bell housing 117 via an axial fixing 111. The lock to be provided for this is also used to torsionally secure release system 118. The electrical connection of an electrical central release actuator can also be integrated here as a plug connection.

On the engine shaft or crankshaft 101, a primary mass part 102 is attached to a sealed-off area of the dual-mass flywheel. The joining of the parts of the dual-mass flywheel is accomplished in the assembly of engine block and transmission, which is represented by the bottom illustration in FIG. 1. A centering element 115 and torque transmission are to be achieved in this way.

The axial force in reaction to the disengagement force is supported via the clutch cover. A slight bearing 108 can be provided between the parts of the dual-mass flywheel without axial fixation.

In the dismantling, the transmission can be separated from the engine block. Only a relatively small axial travel is covered in this. This is especially advantageous in a front-transverse installation of the transmission. A damaging of parts is thereby prevented. Next the lock between release system 118 and clutch bell housing 117 is released. A replacement of individual clutch plates is then possible by further dismantling clutch system 106.

Figure 2:
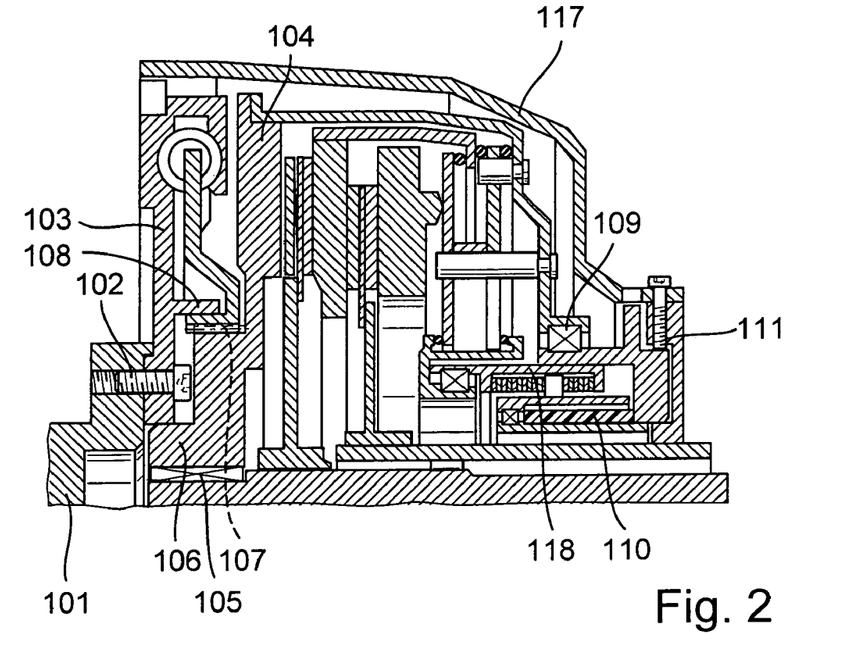
FIG. 2 illustrates a system having a clutch system according to FIG. 1 fixed within a clutch bell housing.

FIG. 2 shows a system having the clutch system 106 according to FIG. 1 fitted within clutch bell housing 117. In this system, an axial force support of clutch system 106 is provided. Furthermore, axial fixing 111 of release system 118 is shown. Release system 118 in this system has an interior stator 110.

Figure 3:
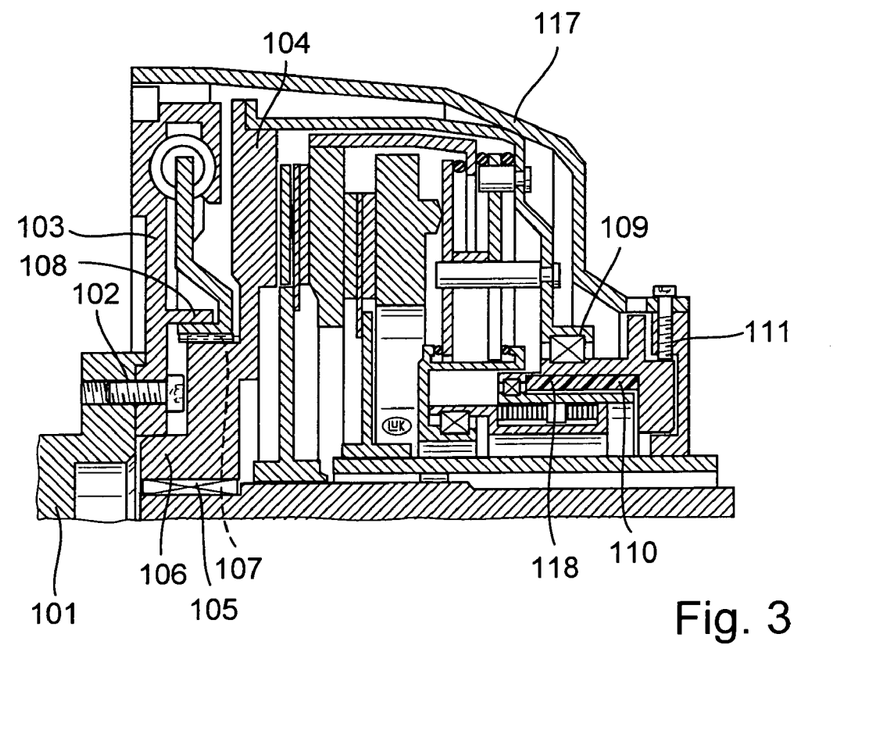
FIG. 3 illustrates another system having a clutch system according to FIG. 1 fixed within a clutch bell housing.

Depicted in FIG. 3 is another system with the clutch system 106 fixed in clutch bell housing 117. This system differs from the system according to FIG. 2 only by a housing of release system 118 that is depicted in simplified form. This is achieved by using a stator 110.

Figure 4:
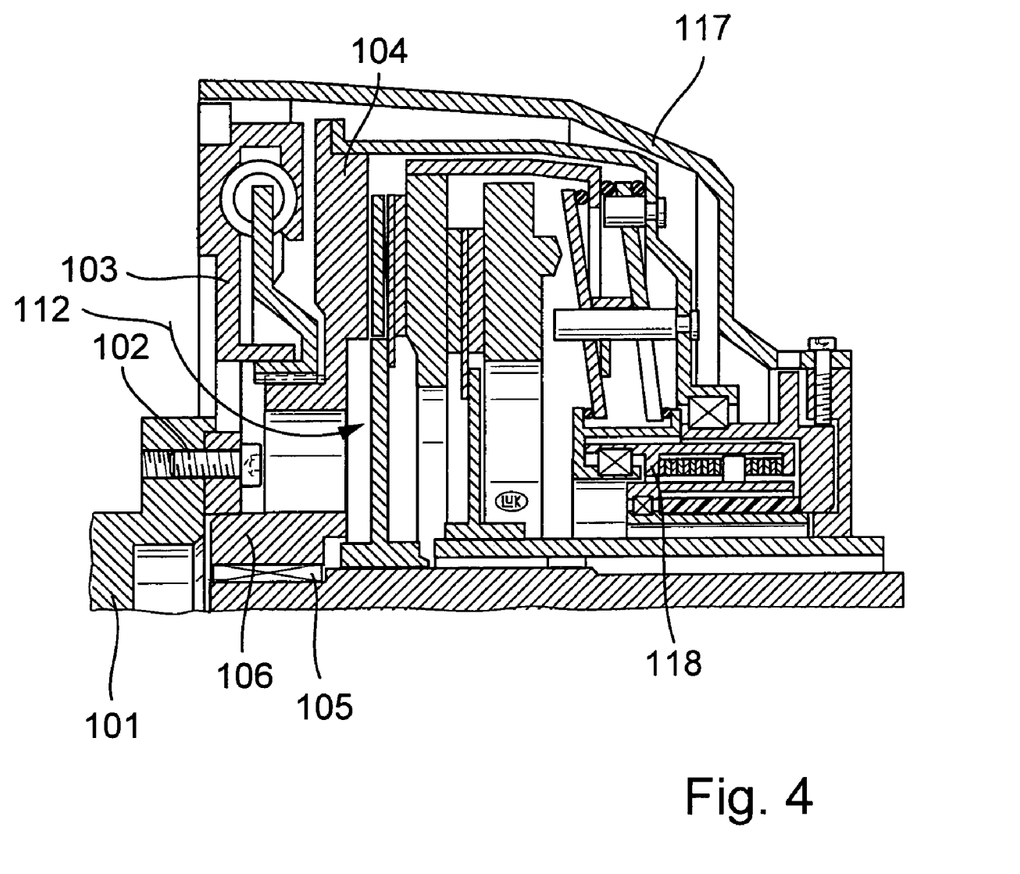
FIG. 4 illustrates a system having a clutch system according to FIG. 1 fixed within a clutch bell housing having an airflow through the inner area of a dual-mass flywheel.

In FIG. 4 an arrangement having a clutch system 106 affixed in clutch bell housing 117 is shown with an air flow through the inner area of the dual-mass flywheel. This is achieved in particular by displacement of the axially supportive roller bearing in the clutch over. The possible air flow is indicated by an arrow 112 in FIG. 4.

Figure 5:
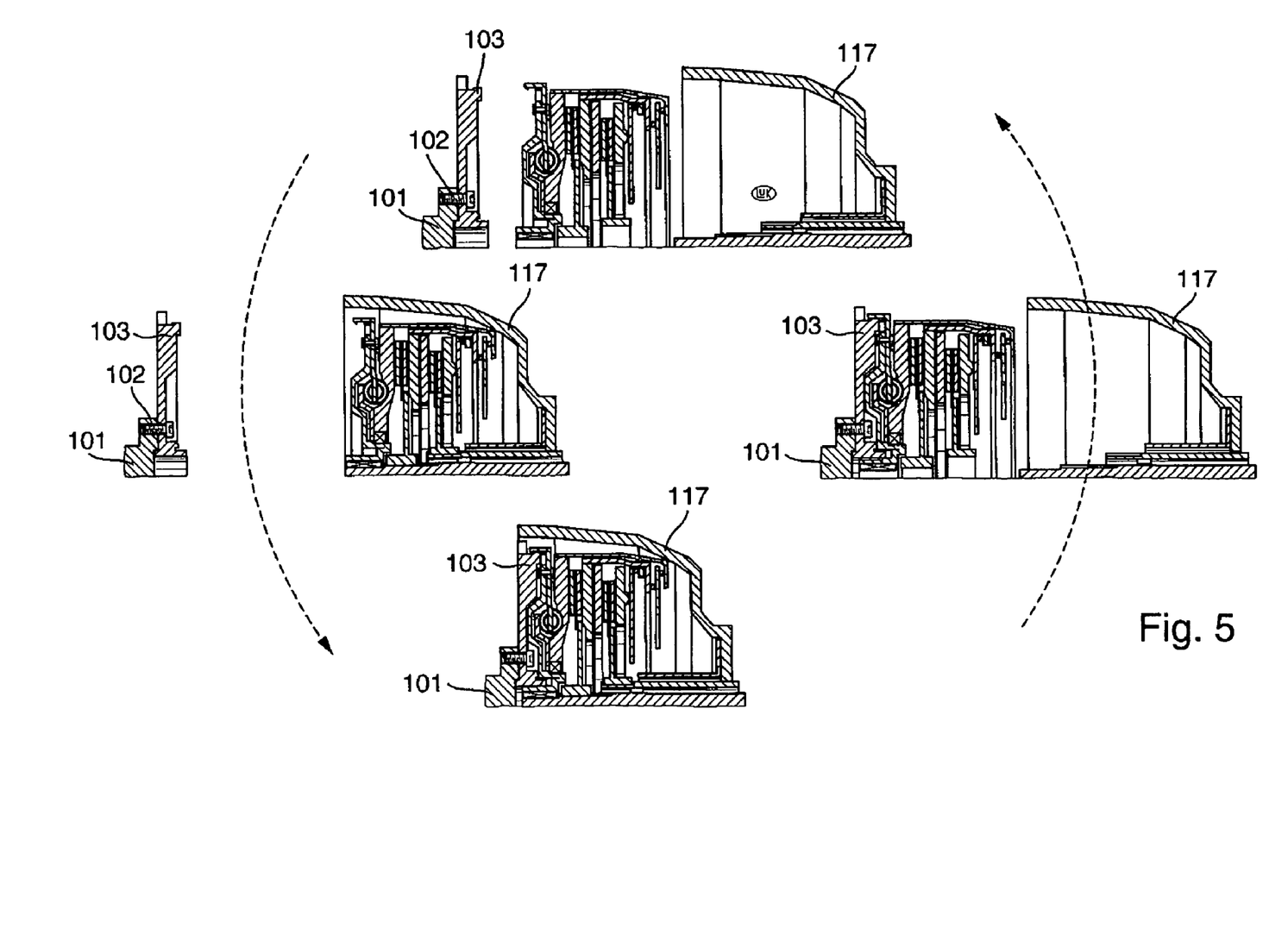
FIG. 5 illustrates another possible variant of the method according to the invention for assembling and dismantling the clutch system.

Another assembly variant according to the present invention is shown in FIG. 5, in which several illustrations depict the assembling and dismantling sequence. In this variant, clutch system 106 is axially fastened to the engine shaft.

For this purpose, release system 118 is placed in clutch bell housing 117. A unit comprising secondary mass part 104 and clutch system 106 is represented (top illustration). This is then introduced in clutch bell housing 117 (center illustration).

Primary mass part 103 of the dual-mass flywheel is attached as a single part to the engine shaft by a bolt connection 102. If the transmission along with clutch system 106 is fit onto the engine block (bottom illustration), a connection is produced between primary mass part 103 and clutch system 106. For this purpose a centering element 115, a torsional slaving element 107 and an axial fixing 111 are provided by a lock, especially when there is tractive operation of clutch system 106.

In the dismantling, the transmission can be separated from the engine block. However, in this context the transmission input shafts must be completely extracted from clutch system 106. Then the lock between primary mass part 103 and clutch system 106 is released. A replacement of individual clutch plates is then possible by further dismantling clutch system 106.

Figure 6:
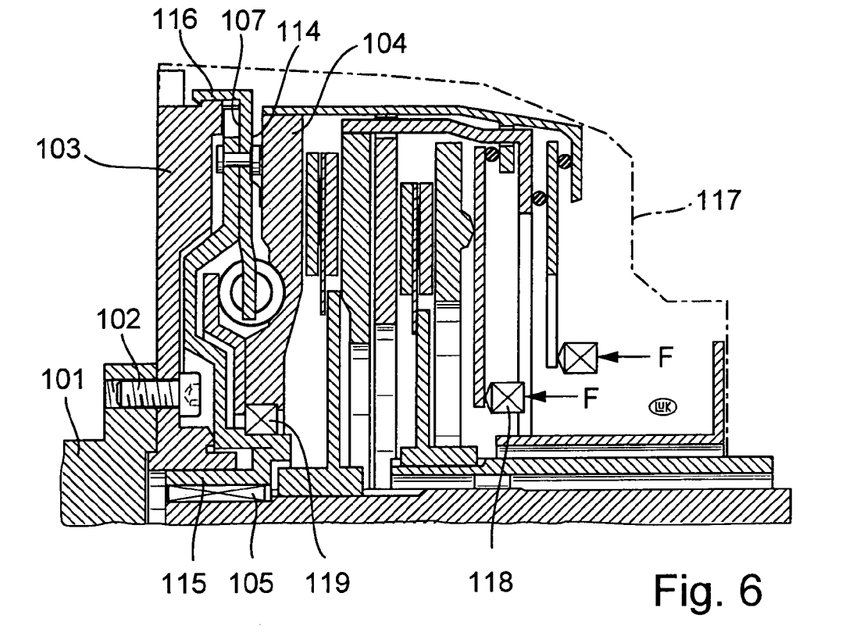
FIG. 6 illustrates a system having an exterior lock and a primary mass part of the dual-mass flywheel bolted onto the engine shaft according to FIG. 5.

Depicted in FIG. 6 is a system having an exterior lock element 116 and the primary mass part 114 of the dual-mass flywheel according to FIG. 5 that is bolted to the engine shaft. Furthermore, torsional slaving element 107 is designed as a key and provided in the area of a primary mass part 114 on the clutch side. In this arrangement a bearing 119 is disposed between primary mass part 114 and secondary mass part 104.

Figure 7:
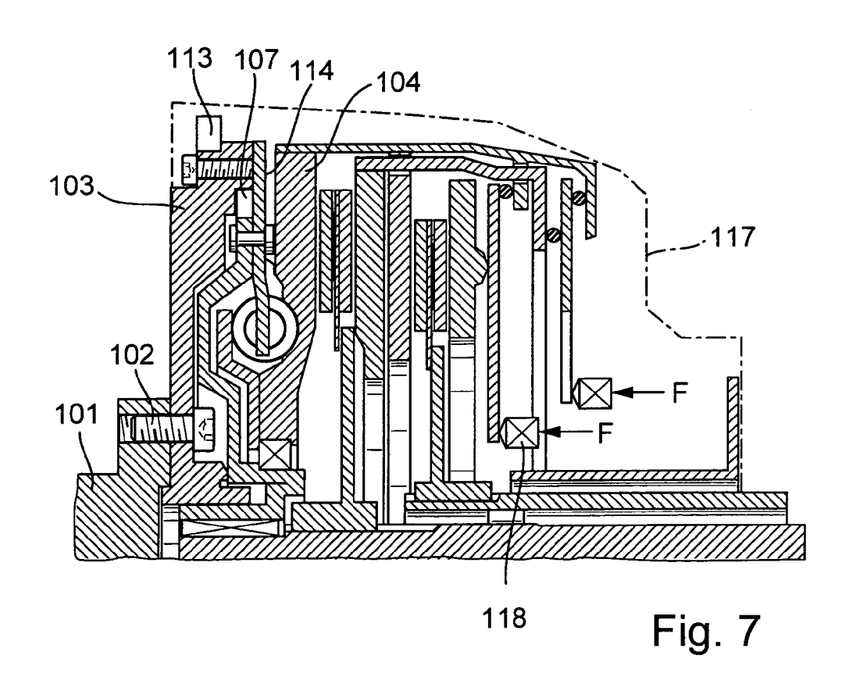
FIG. 7 illustrates a system having an outer bolt connection of the clutch system to the flywheel and having a primary mass part of the flywheel according to FIG. 5 bolted to the engine shaft.

FIG. 7 shows another system having exterior connecting bolts 113 to connect clutch system 106 to the dual-mass flywheel. Connecting bolts 113 can preferably be installed on the engine side. Moreover, primary mass part 103 on the engine shaft side is joined to the engine shaft, a corresponding bolt connection 102 being used. Also in this system a torsional slaving element 107 having a key is provided. In the systems according to FIG. 6 and 7, torsional slaving element 107 can also act on a larger diameter.

Figure 8:
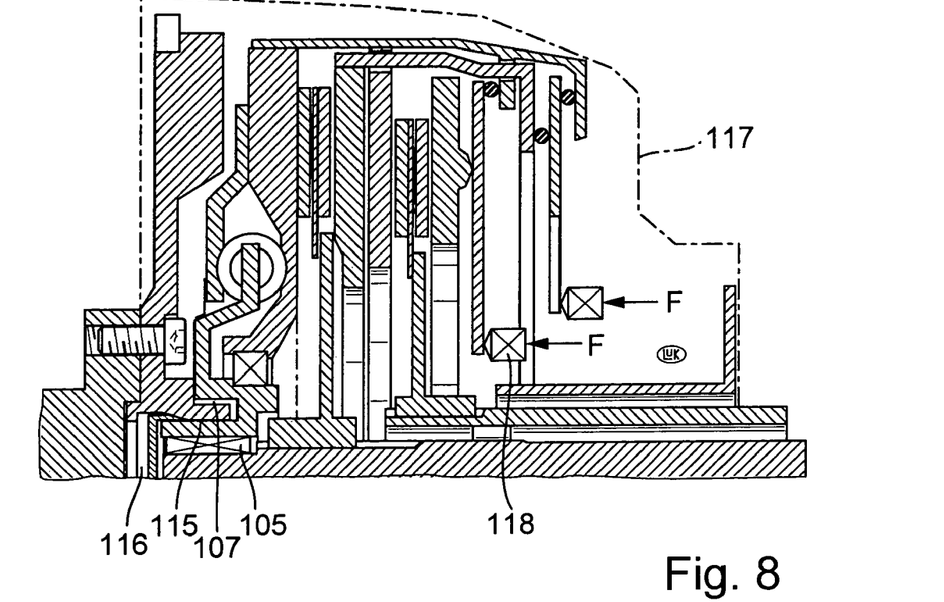
FIG. 8 illustrates a system having an interior lock and a primary mass part of the flywheel according to FIG. 5 bolted to the engine shaft; and, FIG. 9 illustrates a system having an interior lock and a primary mass part of the flywheel according to FIG. 5 affixed to the clutch system.

Depicted in FIG. 8 is a next system having an interior lock 116, which is designed to be detachable. Furthermore, primary mass part 103 of the flywheel is bolted to the engine shaft. Also in this case, a centering element 115 of clutch system 106 in relation to engine shaft 101 is provided.

Figure 9:
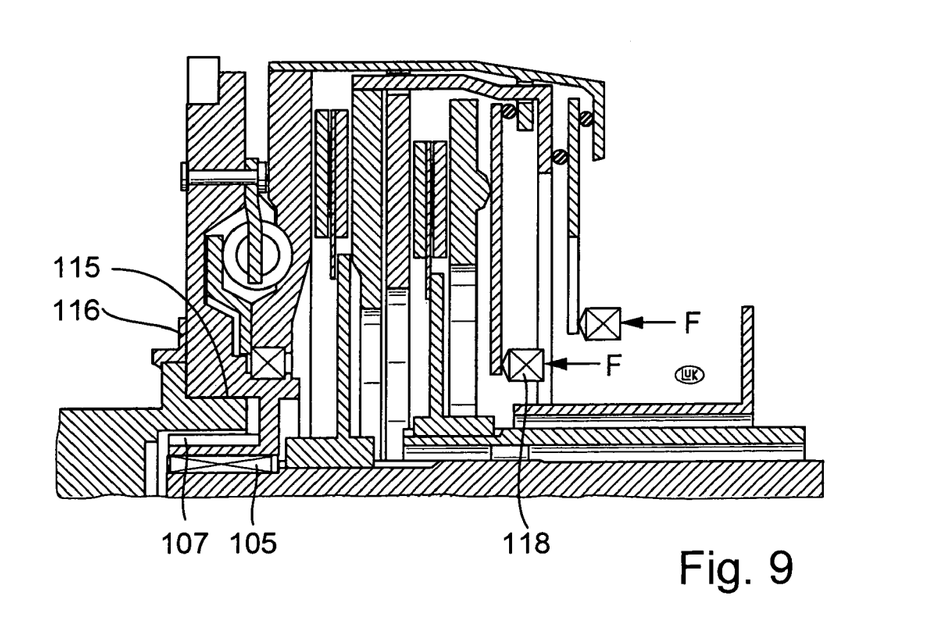

FIG. 9 shows another system, likewise having an interior lock 116. Primary mass part 103 of the flywheel is attached to clutch system 106. In contrast to the other systems, the dual-mass flywheel in FIG. 9 is integrated in the clutch block.

The axial fixation to the engine shaft can be designed according to the force direction of the clutch actuation. If, for example, only compressive forces occur, then two-sided force support can be omitted. Before dismantling the transmission, the bolt connections can be unscrewed. The clutch parts remain in clutch bell housing 117. The necessary travel to extract the transmission from the engine block is thereby substantially reduced.

The proposed systems can also be combined with a release system 118 affixed to the cover. Furthermore, the systems can be used for combination clutch system 106 with compressive and tractive operation. However, before dismantling the transmission, a junction point must be separated. This can be, for example, the connection of the release system 118 or, in accordance with FIG. 7, lock 116 of the clutch system 106.

In all systems, the provided clutch system can be assembled and dismantled in the easiest manner when employing the method according to the invention.

What is claimed is:

1. A method for assembling a clutch system on a drive train comprising the steps of:
    integrating clutch plates of the clutch system and at least one part of a dual-mass flywheel in a transmission;
    mounting a secondary mass part of the dual-mass flywheel, the clutch plates, and a release system for the clutch system as a unit in a clutch bell housing, wherein the unit in the clutch bell housing is separated from the transmission; and,
    installing the clutch system on the transmission; and, joining the transmission to an engine block.

2. The method as described in claim 1, wherein the unit is fixed in an axial direction within the clutch bell housing.

3. The method as described in claim 1, wherein a pilot bearing is integrated in the parts of the clutch system in order to secure the clutch on the transmission in the radial direction during assembly.

4. The method as described in claim 1, further comprising the step of integrating at least one part of the dual-mass flywheel in the engine.

5. The method as described in claim 4, wherein the primary mass part is, attached to a sealed off area of the dual-mass flywheel on the engine shaft.

6. The method as described in claim 1, wherein during the joining of engine block and transmission, the individual parts of the dual-mass flywheel are connected to each other, a centering and torque transmission being enabled.

7. The method as described in claim 1, wherein for dismantling, the transmission is separated from the engine block and then the release system and the clutch bell housing are detached from each other to enable a replacement of individual clutch plates by additional dismantling of the clutch system.

8. The method as described in claim 1 further comprising the step of integrating a release system for the clutch system, clutch plates of the clutch system and at least on part of a dual-mass flywheel in the transmission.

9. The method as described in claim 8 further comprising the step of mounting the release system as well as the secondary mass part of the dual-mass flywheel and the clutch plates as a unit in the clutch bell housing of the transmission.

10. The method as described in claim 8, wherein, when joining transmission and engine block, the primary mass part of the dual-mass flywheel and the clutch system are connected to each other.

11. The method as described in claim 10, wherein a centering element, a torsional slaving element and an axial fixation are used.

12. The method as described in claim 8, wherein for the dismantling, the transmission is separated from the engine block in such a manner that the transmission input shafts are completely extracted from the clutch system and then a lock between the primary mass part of the dual-mass flywheel and the clutch system is released to enable a replacement of individual clutch plates by further dismantling.

13. The method as described in claim 1 further comprising the step of integrating at least one part of the dual-mass flywheel in the engine.

14. The method as described in claim 13 further comprising the step of bolting the primary mass part of the dual-mass flywheel to the engine shaft of the engine.

15. The method as described in claim 1, wherein said method is used in a combination clutch of a seamless transmission (USG) and/or in a dual clutch of a dual clutch transmission (DKG).

16. A method for assembling a clutch system on a drive train comprising the steps of:
   integrating clutch plates of the clutch system and at least one part of a dual-mass flywheel in a transmission;
   mounting a secondary mass part of the duel-mass flywheel, the clutch plates, and a release system for the clutch system as a unit in a clutch bell housing, wherein said unit in said clutch bell housing is separated from the transmission; and,
   installing the clutch system in a combination clutch of a seamless transmission (USG) and/or in a dual clutch of a dual clutch transmission (DKG).

* * * * *